(12) United States Patent
Yamasaki et al.

(10) Patent No.: US 7,410,264 B2
(45) Date of Patent: Aug. 12, 2008

(54) IMAGE DISPLAY APPARATUS FORMING OPTICAL IMAGE BY IRRADIATING LIGHT FROM LIGHT SOURCE ONTO IMAGE DISPLAY ELEMENT

(75) Inventors: Futoshi Yamasaki, Yokohama (JP); Masahiko Yatsu, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 329 days.

(21) Appl. No.: 11/109,875

(22) Filed: Apr. 20, 2005

(65) Prior Publication Data

US 2005/0237488 A1 Oct. 27, 2005

(30) Foreign Application Priority Data

Apr. 22, 2004 (JP) ............................. 2004-126852

(51) Int. Cl.
G03B 21/26 (2006.01)
F21V 7/04 (2006.01)
H04N 5/70 (2006.01)

(52) U.S. Cl. ............................. 353/94; 353/30; 362/612; 362/555; 362/800; 348/801

(58) Field of Classification Search .................. 353/94, 353/30; 362/612, 555, 800; 348/801
See application file for complete search history.

(56) References Cited

U.S. PATENT DOCUMENTS

| 6,547,421 | B2 * | 4/2003 | Sugano | 362/268 |
| 7,192,147 | B2 * | 3/2007 | Sakata et al. | 362/19 |
| 2003/0231497 | A1 * | 12/2003 | Sakata et al. | 362/341 |
| 2006/0050245 | A1 * | 3/2006 | Arai et al. | 353/85 |
| 2006/0132725 | A1 * | 6/2006 | Terada et al. | 353/102 |

FOREIGN PATENT DOCUMENTS

| JP | 10-301201 | 11/1998 |
| JP | 2001-249400 | 9/2001 |
| JP | 2001-343706 | 12/2001 |

* cited by examiner

*Primary Examiner*—Diane I. Lee
*Assistant Examiner*—Magda Cruz
(74) *Attorney, Agent, or Firm*—McDermott Will & Emery LLP

(57) ABSTRACT

A technique is provided that improves the usage ratio of light in the illumination optical system of an image display apparatus, in which the cross-sectional size or shape of the flux of light that has formed a light source image of an LED-based light-emitting section is converted by anamorphic optics, such as collimator lens, into a size or shape appropriate for an aperture in the portion that permits the flux of the light source image to pass through, in an optical system leading to an image display element(s), and thus the quantity of fluxes of light passed through the aperture is increased.

16 Claims, 8 Drawing Sheets

IMAGE DISPLAY APPARATUS FORMING OPTICAL IMAGE BY IRRADIATING LIGHT FROM LIGHT SOURCE ONTO IMAGE DISPLAY ELEMENT

CLAIM OF PRIORITY

The present application claims priority from Japanese application serial no. P2004-126852, filed on Apr. 22, 2004, the content of which is hereby incorporated by reference into this application.

BACKGROUND OF THE INVENTION

The present invention relates to an image display technique intended to display images by irradiating light from light sources onto image display elements and forming an optical image. More particularly, the invention is concerned with a technique intended for displaying bright images.

Known examples of projection image display apparatus include a liquid-crystal projector that irradiates light from a light source onto a liquid-crystal panel such as an image display element, and projects an image in enlarged form on the liquid-crystal panel.

A great number of types of products (projection image display apparatus) applying one or multiple lamps and capable of supplying large electric power to the light source(s) in order to obtain higher luminance have been materialized up to now. Recent trends are that applying light-emitting diodes, organic electroluminescent (EL) elements, or the like, as so-called LED (Light-Emitting Diode) light sources, is being considered for reasons such as their high color purity, excellent longevity, and rapid lighting response. In this case, an LED light unit having a number of arrayed LED light sources is usually used to compensate for the insufficiency of luminance. Examples of the projection image display apparatus that employs such an LED light unit are described in Japanese Patent Laid-Open Nos. 2001-249400 and 2001-343706.

SUMMARY OF THE INVENTION

During the substantiation of the projection image display apparatus employing LEDs or other light-emitting elements as an LED light unit, it is difficult to obtain sufficient luminance for projected images since the amount of exit light flux per light source is very small, compared with that of an existing light source such as a high-pressure mercury lamp. A plan for arranging multiple light sources to form a light source unit is therefore laid open. In the illumination optical system of a projection image display apparatus, when a flux of light is acquired from individual LED light sources and the light is irradiated onto an image display element, it is possible to irradiate the image display element itself more brightly by condensing more fluxes of light. However, as more fluxes are condensed, the condensing angle of the fluxes will increase and the resulting decrease in the efficiency of the optical system for projection will consequently disable a projected image to be made bright. Accordingly, it is required that the image display element be irradiated without an increase in the condensing angle of the fluxes. Although the improvement of the illumination optical system in efficiency is required in order to satisfy that requirement, the light-emitting portions of the LED light sources are too large to be called spot light sources, and this is a hindrance to the improvement of the illumination optical system in efficiency.

Figure 2A:
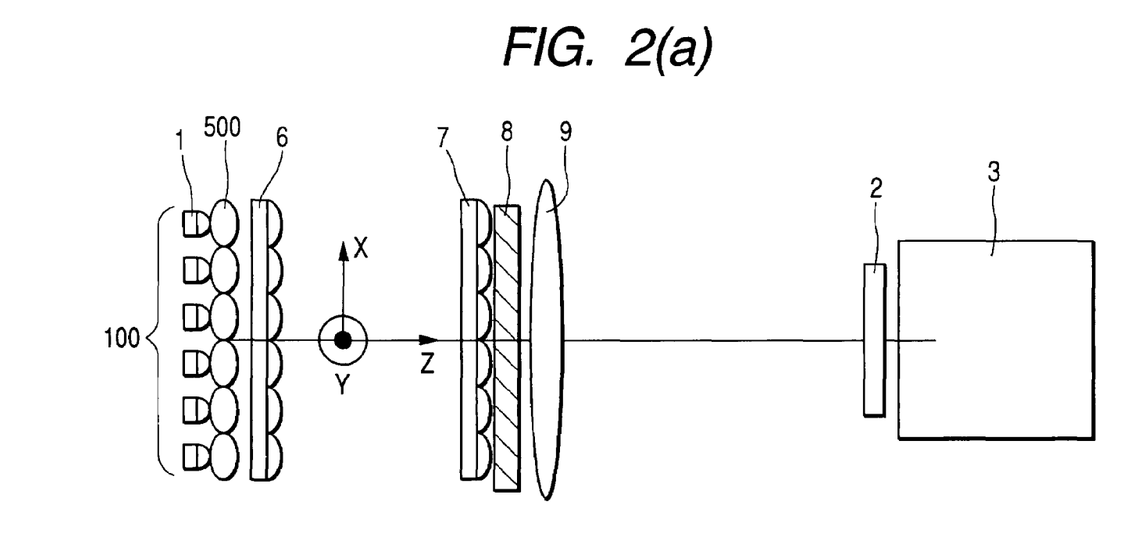
FIG. 2 is a block diagram of the optical system in the general projection image display apparatus which applies LEDs.
Figure 2B:
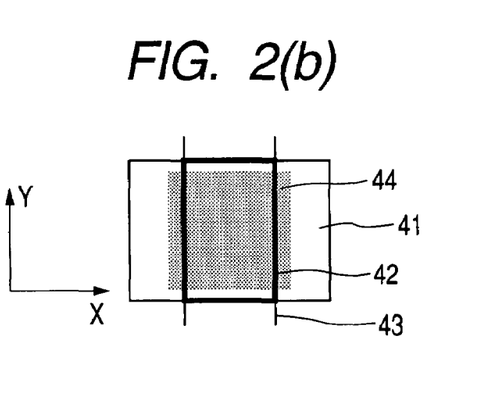

FIGS. 2A is a block diagram of the optical system in the general projection image display apparatus which applies LEDs, and this figure shows the optical system on a linear optical path basis with an optical path-bending mirror, color separation optics, and other optics emitted. FIG. 2B shows the light source image formed near the exit side of a second lens array. In FIG. 2A, divergent light from the light-emitting portions of LED elements 1 is condensed onto collimator lenses 500 associated with the LED elements 1, and then enters an illumination optical system. The illumination optical system includes: an optical integrator constituted by a first lens array 6 and the above-mentioned second lens array; a polarizing conversion element 8 on which, for example, two PBS prisms for aligning fluxes of light in a desired direction of polarization are columnarly stacked as a unit prism unit; and a condensing lens 9.

The light incident from each LED element 1 upon the illumination optical system passes through the appropriate lens cell of the optical integrator and further enters the appropriate unit prism unit of the polarizing conversion element 8. In the unit prism unit, the light then has its fluxes aligned in the desired direction of polarization. Next, these fluxes are superimposed on a liquid-crystal panel 2 to irradiate this panel almost uniformly. After this, the optical image thus formed is enlarged and projected by a projection lens 3. In FIG. 2A, orthogonal coordinates with an optical-axis direction taken as a Z-axis, an axis present in a plane orthogonal to the optical axis and extending from the reverse side of the paper of FIG. 2A, toward the surface thereof, as a Y-axis, and an axis orthogonal thereto, as an X-axis, are introduced for the sake of convenience in the following description.

A light source image of the LED elements 1 is formed on the surface near the exit side of the second lens array 7 by the first lens array 6. The relationship between the size (area) of the light source image on the above-mentioned image-forming surface, and the maximum cross-sectional area of the optical path of the light passing through the lens cells of the second lens array 7 and the appropriate unit prism unit of the polarizing conversion element 8, is shown in FIG. 2B.

In FIG. 2B, reference number 41 denotes the aperture showing the profile shape of a lens cell of the second lens array 7, on the above image-forming surface. Reference number 43 denotes the both X-axial ends of an incident aperture in the unit prism unit of the polarizing conversion element 8, and 44 the optical image of an LED element that is formed near the exit side of the second lens array 7. The aperture 41 in the second lens array 7 has a shape almost analogous to that of the liquid-crystal panel 2, and the long side and short side of the aperture 41 are present in an X-axial direction and a Y-axial direction, respectively.

After passing through the aperture 41 in the second lens array 7, light is restricted at both ends 43 (hereinafter, the clearance between these ends Is referred to specifically as width) in the X-direction (long-side direction of the aperture 41) of the incident aperture in the unit prism unit of the polarizing conversion element 8. Therefore, the light passes only through the aperture 42. In terms of shape, the aperture 42, as obvious from the figure, is short in the X-direction and long in the Y-direction. Efficiency, however, deteriorates since, as shown in FIG. 2B, there is a mismatch between the shape of the aperture 42 that is restricted by each cell of the second lens array 7 and by the appropriate unit prism unit of the polarizing conversion element 8, and the shape of the optical image 44.

Figure 3A:
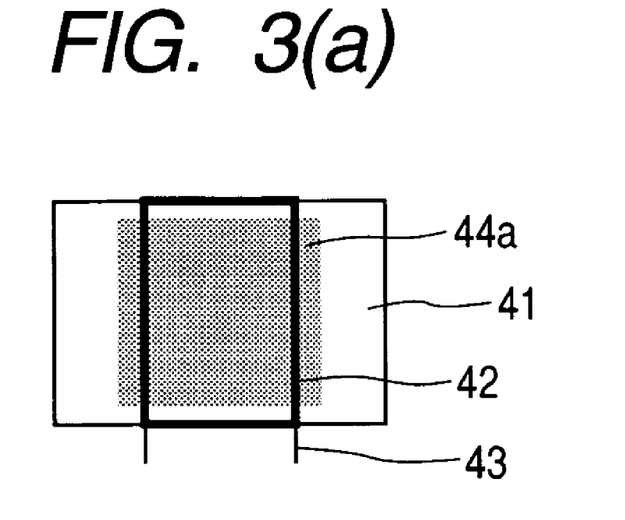
FIG. 3 is an explanatory diagram of the light source image formed at an aperture portion of an illumination optical system.
Figure 3B:
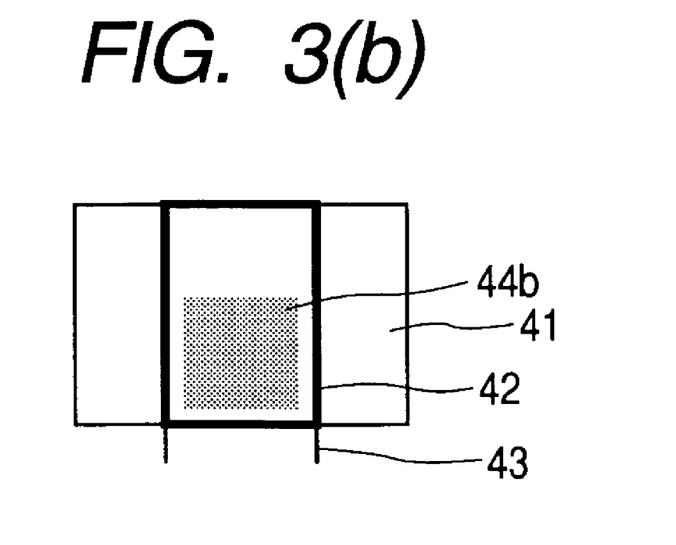

In general, LEDs of high luminance usually have square light-emitting portions. In contrast to this, the shape of the aperture 42 depends on that of the liquid-crystal panel 2, an image display element. In such an image-forming condition as shown in FIG. 3A, since a light source image 44a of an LED is larger than the aperture 42, light is intercepted by the aperture 42 and cannot pass therethrough exists to deteriorate efficiency Also, in such an image-forming condition as shown in FIG. 3B, since a light source image 44b of an LED completely fits in the aperture 42, a region not used (i.e., not permitting light to pass through) exists in the aperture 42 and the optical system decreases in efficiency.

Additionally, for instance, if the liquid-crystal panel 2 in the above example is a very small reflective mirror element, the polarizing conversion element of the illumination optical system is unnecessary. In this case, the relationship between the size (area) of the light source image of the LED element 1, formed near the exit side of the second lens array 7, and the maximum cross-sectional area of the optical path of the light passing through the lens cells of the second lens array 7, appears as in FIG. 2C. That is to say, an aperture 42' that forms the maximum cross-sectional area of the optical path equals to the aperture 41 showing the profile shape of a lens cell of the second lens array 7. In this case, therefore, the light source image 44 becomes smaller than the aperture 42' (41), a region not used (i.e., not permitting light to pass through) exists in the aperture 42' (41), and thus the optical system decreases in efficiency.

With the above conventional technological problems in view, the present invention was made in order to enable the optical system of an image display apparatus to be improved in efficiency by improving the usage rate of light in the illumination optical system of the image display apparatus.

An object of the present invention is to provide an image display technique that enables display of bright images by solving the above problems.

In order to solve the above problems, the present invention provides an image display apparatus for irradiating light from a light source unit with LED-based light-emitting portions onto image display elements and thus forming an optical image based on image signals; wherein a cross-sectional size or shape of the flux of light that have formed a light source image of each LED-based light-emitting portion is converted by anamorphic optics, such as collimator lenses, into a size or shape appropriate for an aperture in the portion of the light source image that permits the flux of light to pass through in an optical system for light-Irradiating the image display element(s), and the amount of passage of the light is increased by, for example, converting an aspect ratio of the cross section of the fluxes. The anamorphic optics improves efficiency of the image display apparatus in its illumination optical system by increasing the amount of passage of the light.

According to the present invention, it is possible to provide an image display technique that enables display of bright images.

DETAILED DESCRIPTION OF THE PREFERRED EMBODIMENTS

Preferred embodiments of the present invention are described hereunder using the accompanying drawings. These embodiments assume that transmissive liquid-crystal panels are used as image display elements. In each drawing, the same reference number is assigned to the constituent element having the same function.

First Embodiment

Figure 1:
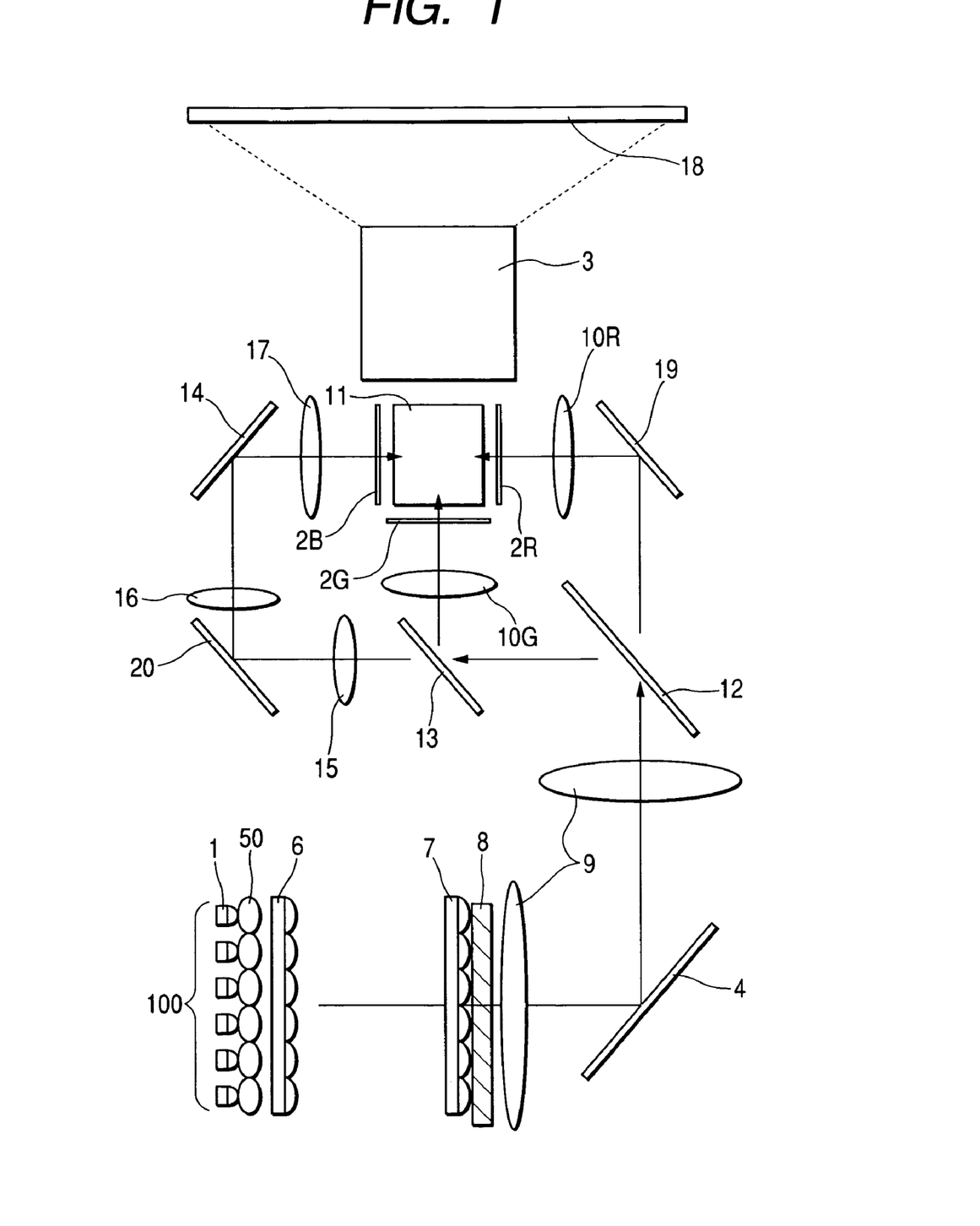
FIG. 1 is a diagram showing a configurational example of a projection image display apparatus as a first embodiment of the present invention.

FIG. 1 is a diagram showing a configuration of a projection image display apparatus as a first embodiment of the present invention.

In FIG. 1, reference number 1 denotes an LED element having a light-emitting diode (LED) portion, and 100 a light source unit formed as a two-dimensional array of plural LED elements 1. Each LED element 1 has a collimator lens 50 for condensing light divergent from an LED portion (not shown) of an LED chip and introducing the light into an optical system for illumination. The collimator lens 50 forms anamorphic optics. Symbols 2R, 2G, and 2B denote transmissive liquid-crystal panels that are image display elements associated with the three primary colors of light, namely, red, green, and blue, respectively. Hereinafter, red light, green light, and blue light are referred to as R-light, G-light, and B-light, respectively. These liquid-crystal panels activate an image signal driver (not shown) to perform light intensity modulations responsive to image signals, upon the fluxes of light irradiated from each LED element 1, and thus to form an optical image. Reference number 3 denotes a projection lens unit, 4 a mirror, and 6 and 7 a first lens array and second lens array, respectively, that constitute an integrator optical system for forming a light source image of the LED portion provided within the LED element 1. Reference number 8 denotes a polarizing conversion element for aligning the fluxes of light sent from the integrator optical system, in a desired direction of polarization, 9 a condensing lens, 10R and 10G both a condenser lens, 11 a synthesizing prism, 12 and 13 both a dichroic mirror for color separation, 14 a mirror, 15 a first relay lens, 16 a second relay lens, 17 a third relay lens, 18 a screen, and 19 and 20 both a mirror. In addition to these elements, there is a power supply circuit (not shown) as a major component.

In FIG. 1, the white rays of light that have been emitted from light-emitting diodes (LEDs, not shown) of each LED chip of the LED elements 1 constituting a light source unit 100 are made almost parallel at associated collimator lenses 50 and then enter the first lens array 6 of the integrator optical system. The first lens array 6 including the plurality of lens cells arranged in a matrix format splits the incident light into a plurality of fluxes and introduces the fluxes into the second lens array 7 and the polarizing conversion element 8 so as to pass through both thereof. The second lens array 7 which, as with the first lens array 6, includes the plurality of lens cells arranged in a matrix format activates lens cells to project shapes of the associated lens cells of the first lens array 6 onto the transmissive liquid-crystal panels 2R, 2G, 2B. At this time, the polarizing conversion element 8 causes the fluxes of light from the second lens array 7 to align in a desired direction of polarization. Projection images of the lens cells of the first lens array 6 and second lens array 7 are superimposed on the liquid-crystal panels 2R, 2G, 2B, by the condensing lens 9, the condenser lenses 10R, 10G, the first relay lens 15, the second relay lens 16, and the third relay lens 17.

The white light, after being emitted from the LED elements 1 of the light source unit 100, is color-separated into the three primary colors of light, namely, R-light, G-light, and B-light components, each of which is then irradiated onto the appropriate liquid-crystal panel 2R, 2G, or 2B, respectively. The present embodiment assumes that the dichroic mirror 12 has the characteristics to transmit red light and reflect green light and blue light, and that the dichroic mirror 13 has the characteristics to reflect green light and transmit blue light.

Each of the liquid-crystal panels 2R, 2G, 2B, forms an optical image by controlling the amount of light transmitted through the liquid-crystal panel, in coordination with an incident/exit-light polarizing plate (not shown) and an image signal driver (not shown), and conducting light intensity modulations for pixel-by-pixel changes in contrast.

The optical images that have been formed on the liquid-crystal panels 2R, 2G, 2B, by the irradiation are color-synthesized by the synthesizing prism 11 and further projected onto the screen 18, whereby a large-screen image is displayed.

The first relay lens 15, the second relay lens 16, and the third relay lens 17 compensate for an excess of an optical path length of the liquid-crystal panel 2B with respect to optical path lengths of the liquid-crystal panels 2R, 2G.

Characteristics of the collimator lens 50 used in association with each LED element 1 are described given.

A light-emitting portion (LED portion, not shown) of the LED element 1 has a square shape, and a light source image of the square LED portion is formed near the exit side of the second lens array 7 by the collimator lens 50 and the first lens array 6.

Use of the conventional collimator lens 500 also forms an image having a square shape, which is analogous to that of the light-emitting portion (not shown).

In contrast to this, an aperture formed under restrictions on a rectangular shape of each cell of the second lens array 7 and on a range of incidence in a transverse (X) direction at the appropriate unit prism unit of the polarizing conversion element 8, has the rectangular shape that the aperture is long in the Y-direction, as mentioned in the description of FIG. 2. For this reason, the use of the conventional collimator lens 500 reduces efficiency of the illumination optical system, as mentioned earlier herein.

The collimator lens 50 forms the anamorphic optics whose enlarging ratio and focal length in a vertical direction differ from those of a horizontal direction orthogonal to the vertical direction. Near the exit side of the second lens array 7, therefore, an image of the LED portion is formed with a difference between the enlarging ratio and focal length in the Y-direction (hereinafter, referred to the vertical direction) and those of the X-direction (likewise, the horizontal direction). That is to say, in the first embodiment, the horizontal enlarging ratio is reduced below the vertical enlarging ratio. Consequently, the image of the LED portion of the LED element 1, formed near the exit side of the second lens array 7, takes a vertically long rectangular shape, not the conventional square shape. In other words, vertically long rectangular shape of the image can be made to almost agree with the shape of the aperture 42 formed under restrictions on the rectangular shape of each cell of the second lens array 7 and on the range of incidence in the transverse direction at the appropriate unit prism unit of the polarizing conversion element 8. Accordingly, it is possible to prevent the light from the LED element 1 from being intercepted and incapable of passing through, a region not used (i.e., a region not permitting the light to pass through) from existing in the aperture 42, and thus to enhance a usage ratio of the light and obtain high efficiency.

A shape of the collimator lens 50 conducting the above action as the anamorphic optics, is described below.

When the first lens array 6 has a focal length of "fm1" and the collimator lens 50 has a focal length of "fc", the enlarging ratio (magnification) of the image formed near the exit side of the second lens array 7 with respect to the LED portion of the LED element 1 is given by the following expression;

$$\text{Enlarging ratio} = fm1/fc \qquad \text{(Expression 1)}$$

For the conventional collimator lens 500 having a symmetrical structure with respect to the optical axis, vertical and horizontal enlarging ratios are constant and the image at the square LED portion of the LED element 1 is formed maintaining an aspect ratio. Unlike the conventional collimator lens, however, the collimator lens 50 as the anamorphic optics in the present invention causes an image to have two kinds of focal lengths, vertical and horizontal, since the image have different enlarging ratios in vertical and horizontal directions.

Figure 4A:
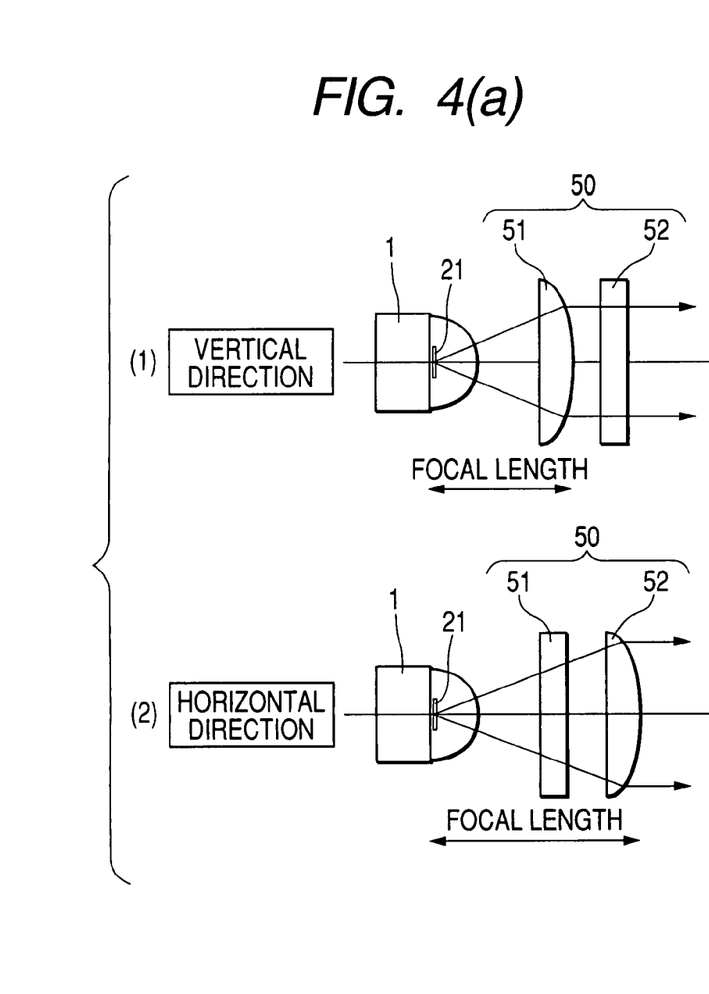
FIG. 4 is an explanatory diagram of anamorphic optics.
Figure 4B:
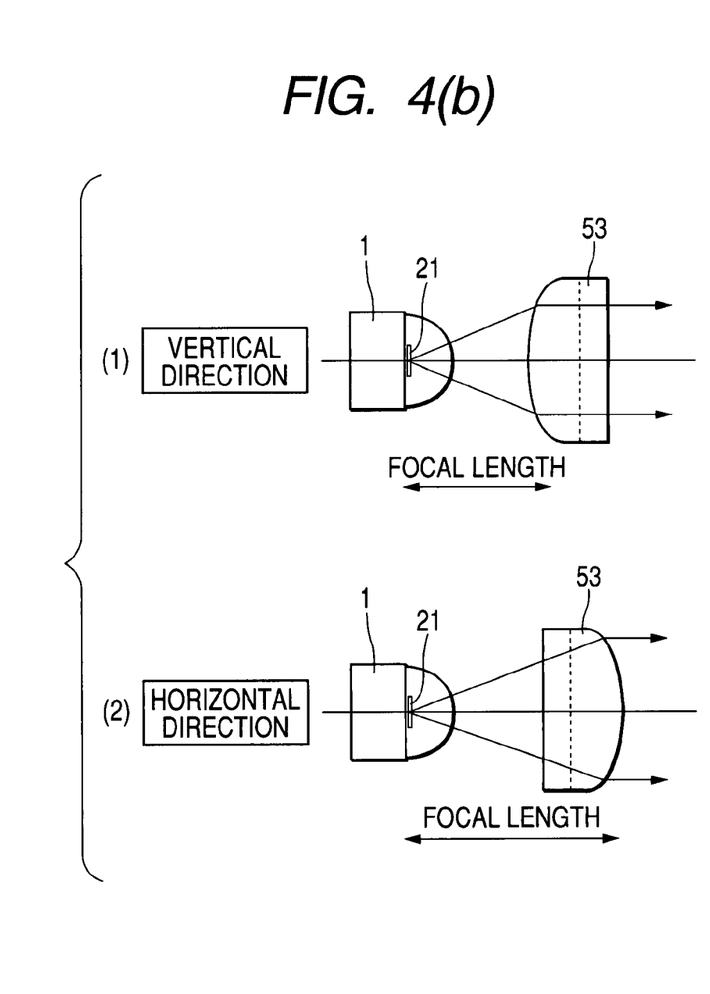

FIGS. 4A and 4B are explanatory diagrams of the anamorphic optics.

FIG. 4A shows a method of combining two anamorphic lenses (or cylindrical lenses) having a lens action in directions orthogonal to each other. These lenses determine vertical (Y-axial) and horizontal (X-axial) focal lengths with respect to rays 1. In the present invention, the collimator lens 50 needs to reduce the vertical focal length (increase the enlarging ratio) and increase the horizontal focal length (reduce the enlarging ratio) in order to image a shape of a square LED portion 21 into a vertically long rectangular form. Accordingly, a first anamorphic lens 51 close to the LED portion 21 of the LED element 1 is used to determine the vertical focal length, and a second anamorphic lens 52 far from the LED portion 21 is used to determine the horizontal focal length. Graphic representations of both focal lengths in the figure are schematic for the sake of convenience in description.

Specific focal lengths of each lens in the present embodiment are described hereunder. In the description below, numeric values concerning the horizontal (X) direction are each suffixed with "x", and numeric values concerning the vertical (Y) direction, with "y".

The LED portion 21 has a square shape with one side measuring $1 \times 10^{-3}$ m. The aperture 42 formed under restrictions on the rectangular shape of each cell of the associated second lens array 7 and on the range of incidence in the transverse direction at the polarizing conversion element 8 has a vertically long rectangular shape with a width (X-axial dimension) of $3.5 \times 10^{-3}$ m and a height (Y-axial dimension) of $5.4 \times 10^{-3}$ m. Therefore, the focal length of each lens needs to satisfy expressions 2 below for the vertical direction and satisfy expression 3 for the horizontal direction. Symbol "Sw" in expressions 2, 3, denotes the dimension of one side in a desired direction of the aperture 42, and "St", the dimension of one side of the light source LED portion 21.

$$fm1y/fcy = Swy/Sty \qquad \text{(Expression 2)}$$

$$fm1x/fcx = Swx/Stx \qquad \text{(Expression 3)}$$

Mores specifically, for the vertical direction, $Swy = 5.4 \times 10^{-3}$ m, $Sty = 1$, and $fm1y = 35 \times 10^{-3}$ m. Hence, it can be derived from expression 2 that $fcy = 35 \times 1/5.4 = 6.48 \times 10^{-3}$ m.

For the horizontal direction, $Swx=3.5\times10^{-3}$ m, $Stx=1$, and $fm1x=35\times10^{-3}$ m. Hence, $fcx=35\times1/3.5=10\times10^{-3}$ m.

That is to say, when cylindrical surfaces are used, the collimator lens 50 has a vertical focal length (fcy) of $6.48\times10^{-3}$ m and a horizontal focal length (fcx) of $10\times10^{-3}$ m Calculations using the focal length (fm1) of the first lens array 6 have been described above for simplicity and brevity of the description. To further enhance accuracy for maximum efficiency, however, calculations ought to be conducted with the following expression 4 that uses a resultant focal length (fm) of both the first lens array 6 and the second lens array 7, instead of the independent focal length (fm1) of the first lens array 6:

$$fmi/fci = Swi/Sti \quad \text{(Expression 4)}$$

where "i" is a suffix used, Instead of "x" or "y", to denote a horizontal (X-axial) or vertical (Y-axial) numeric value.

Figures 8, 9:
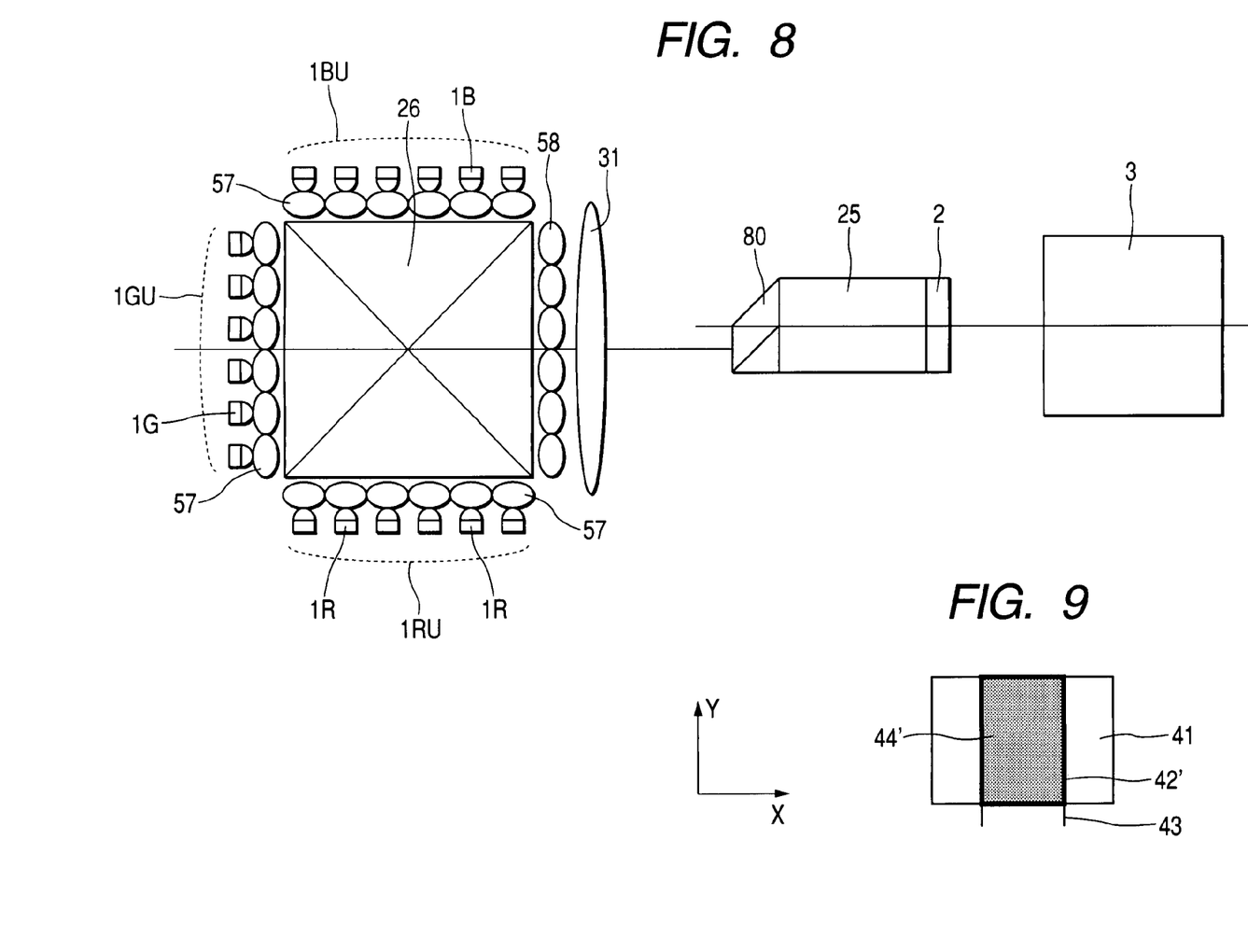
FIG. 8 is a diagram showing a fifth embodiment of the present invention.
FIG. 9 is an explanatory diagram of a light source image in a configuration of FIG. 8.

As a result of above setting, when an image of the LED portion 21 of the LED element 1 which is the light source is formed at the aperture of the illumination optical system, high efficiency can be obtained since, as shown in FIG. 8, the size of the light source image 44 almost agrees with that of the aperture 42.

In the above example, two anamorphic lenses having a lens action in directions orthogonal to each other have been combined for the vertical and horizontal enlarging ratios of the collimator lens to differ from each other. As shown in FIG. 4B, however, two such anamorphic lenses may be integrated into a single lens and an anamorphic lens surface may be provided at incident and exit sides of the single lens so that the lens has a lens action in directions orthogonal to each other. Use of this double-sided anamorphic collimator lens 53, makes it possible to obtain the same effects as those of FIG. 4A.

It is also possible to endow the first lens array 6 of the illumination optical system with a function of the collimator lens 50 forming the anamorphic optics according to the present Invention. In that case, the collimator lens 50 becomes unnecessary, which makes it possible to correspondingly reduce the number of apparatus components.

In addition, although the present embodiment assumes that the LED portion 21 of the LED element 1 has a square shape, when the LED portion 21 is to be designed to have its own different shape, this shape may be made approximately analogous to the shape of the aperture 42 formed under restrictions on the rectangular shape of each cell of the second lens array 7 and on the range of incidence in the transverse (X) direction at the polarizing conversion element 8. In that case, such anamorphic lens(es) and other optics as mentioned above become unnecessary and highly efficient projection can be implemented using a simplified apparatus configuration.

Figure 2C:
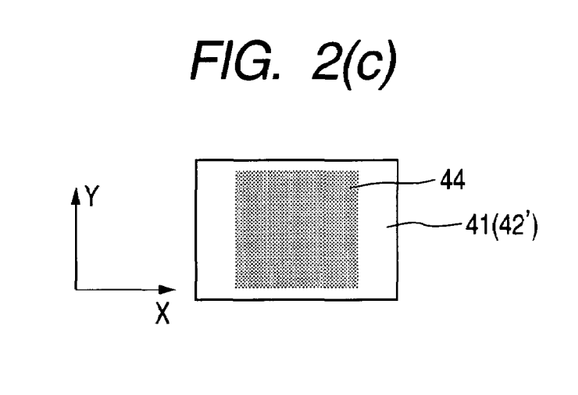

Use of reflective DMD, instead of the liquid-crystal panel 2, in the present embodiment, makes the polarizing conversion element unnecessary. As shown in FIG. 2C, therefore, the aperture 42' having the maximum optical-path cross-sectional area on the image-forming surface near the exit side of the second lens array 7 takes a horizontally long rectangular shape equally to that of the aperture 41 forming a profile of each lens cell of the second lens array 7. Therefore, when a polarizing conversion element is not present, there is a need, conversely to the above, to reduce the vertical enlarging ratio and increase the horizontal enlarging ratio. In short, the two cylindrical surfaces giving a lens action in directions orthogonal to each other need to be arranged in opposite order to that of the above embodiment.

Second Embodiment

Although the above first embodiment uses the LED elements 1 adapted to directly emit light forward, a second embodiment employs reflective LED elements that each emit light forward after reflecting via a reflector the light emitted from an LED portion of the LED element. In addition, the reflector of the reflective LED element and a collimator lens disposed in front thereof constitute anamorphic optics. Thus, the light source image of the reflective LED element that is formed near the exit side of a second lens array 7 is endowed with a shape that almost agrees with a vertically long rectangular shape of an aperture 42 formed under restrictions on a range of incidence in a transverse direction at a unit prism unit of a polarizing conversion element 8.

Figure 5:
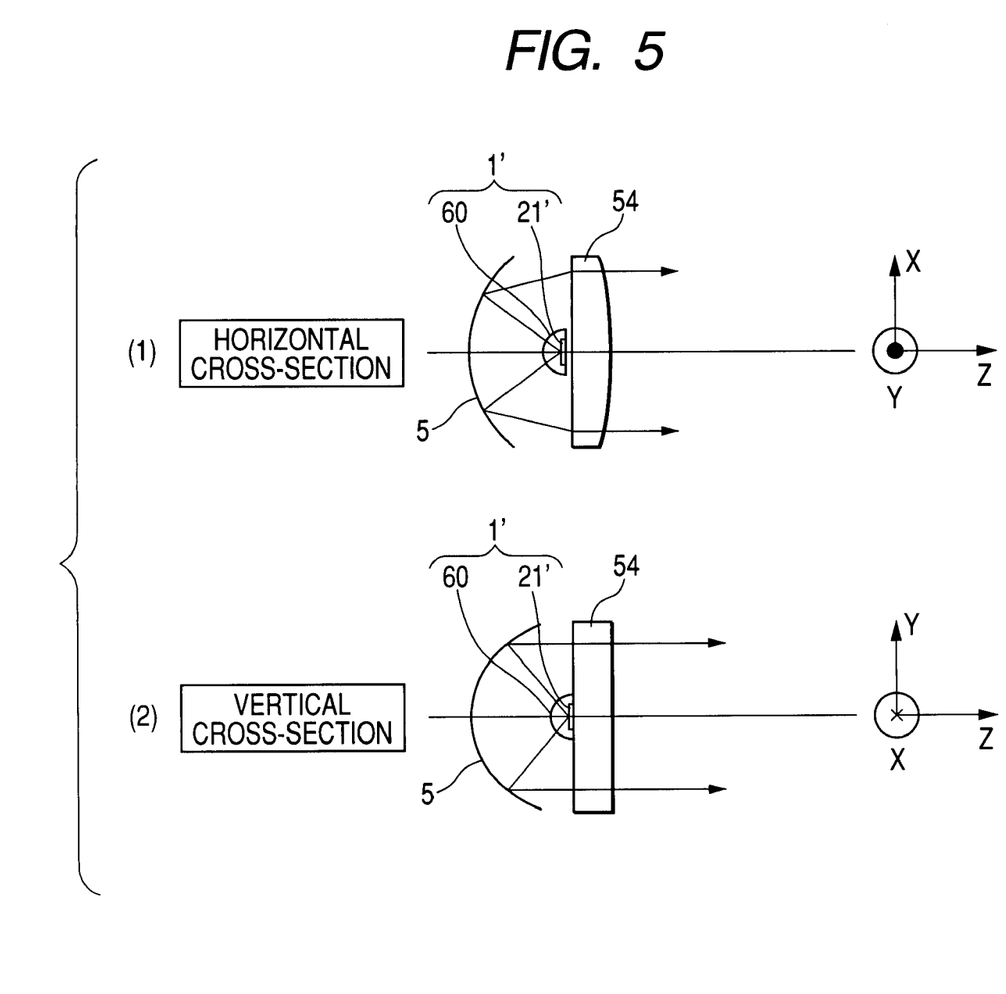
FIG. 5 is a diagram showing a second embodiment of the present invention.

FIG. 5 is a diagram showing a second embodiment of anamorphic optics. The anamorphic optics shown in the present embodiment is used in lieu of the anamorphic optics constituted by the collimator lenses 50 in the first embodiment. A projection image display apparatus is thus constructed.

In FIG. 5, a reflective LED element 1' has, as its LED chip, an LED portion 21' (having a light-emitting surface pointing in a negative direction of a Z-axis). Also, in the figure, the LED portion 21' is sealed with transparent resin 60, and a reflector 5 is provided as a metallic reflecting mirror at the back side (in the negative direction of the Z-axis) of the reflective LED element 1'. The reflective LED element 1' and the reflector 5 form a unit LED-based light source, and a plurality of such unit LED-based light sources are arranged two-dimensionally to construct a light source unit. Additionally, in front of each reflective LED element 1', a collimator lens 54 is provided for each reflective LED element 1'.

The reflector 5 has such an elliptic surface that the LED portion 21' is located near a focal position of the reflector. However, as obvious from FIG. 5, although the surface shape of the reflector is symmetrical in vertical and horizontal directions, it is not rotationally symmetrical in an optical-axis direction and the reflector has a vertical (Y-axial) radius-of-curvature smaller than a horizontal (X-axial) radius-of-curvature. The collimator lens 54 also has an exit-side surface shape symmetrical in vertical and horizontal directions. This surface shape, however, is a spherical or non-spherical convex shape not rotationally symmetrical in an optical-axis direction, and the collimator lens has a vertical (Y-axial) radius-of-curvature greater than a horizontal (X-axial) radius-of-curvature (in FIG. 5, the convex surface is shown as a plane having an infinite radius of curvature in a vertical direction). The reflector 5 and the collimator lens 54 constitute the anamorphic optics whose vertical and horizontal enlarging ratios differ from each other. In the present embodiment, a vertical focal length is reduced below a horizontal one so that a light source image of the square LED portion 21' almost matches with the aperture 42 in terms of shape.

That is, a flux of light that has been emitted from the LED portion 21', toward the reflector 5, is reflected by the reflector 5. At this time, in the horizontal direction, the light is reflected to diverge, since the horizontal radius of curvature of the reflector 5 is large, and thus the light is made parallel to the optical axis since the horizontal radius of curvature of the collimator lens 54 is small. In short, a horizontal focal length of the anamorphic optics is long. Conversely, in the vertical direction, the light is not sufficiently diverged since the horizontal radius of curvature of the reflector 5 is small, and thus the light is made parallel to the optical axis by the collimator lens 54 having a large radius of curvature in the vertical direction. In short, a vertical focal length of the anamorphic optics is short.

As can be seen from the above, even when reflective LED elements are used, constructing anamorphic optics by using the reflector and the collimator lens disposed in front of each reflective LED element makes an optical image of the LED portion almost matchable with the vertically long rectangular aperture 42 in terms of shape, and hence, high efficiency obtainable.

While, in the present embodiment, the reflector has been described as an element independent from the reflective LED element 1', this reflective LED element may have an LED chip whose LED portion is sealed with transparent resin, and also have an integrally formed plane-of-reflection at the side facing a light-emitting surface of the transparent-resin-sealed LED portion, the resin surface of the reflection plane shape being formed with a reflector thereon by deposition with a metal such as silver.

Third Embodiment

Another example of using reflective LED elements is described as a third embodiment of the present invention below.

In the above second embodiment using reflective LED elements, a light source is constituted by each reflective LED element and a reflector provided at a rear side thereof, and anamorphic optics is constituted by the reflector and a collimator lens provided in front of the light source. In the present third embodiment, however, each reflective LED element has an integrally formed reflector at its rear side, a collimator lens provided in front is formed of the light-transmissive transparent resin used to seal a light-emitting portion of the reflective LED element, and anamorphic optics is constituted by the collimator lens formed of the foregoing transparent resin, and by the reflector.

Figure 6:
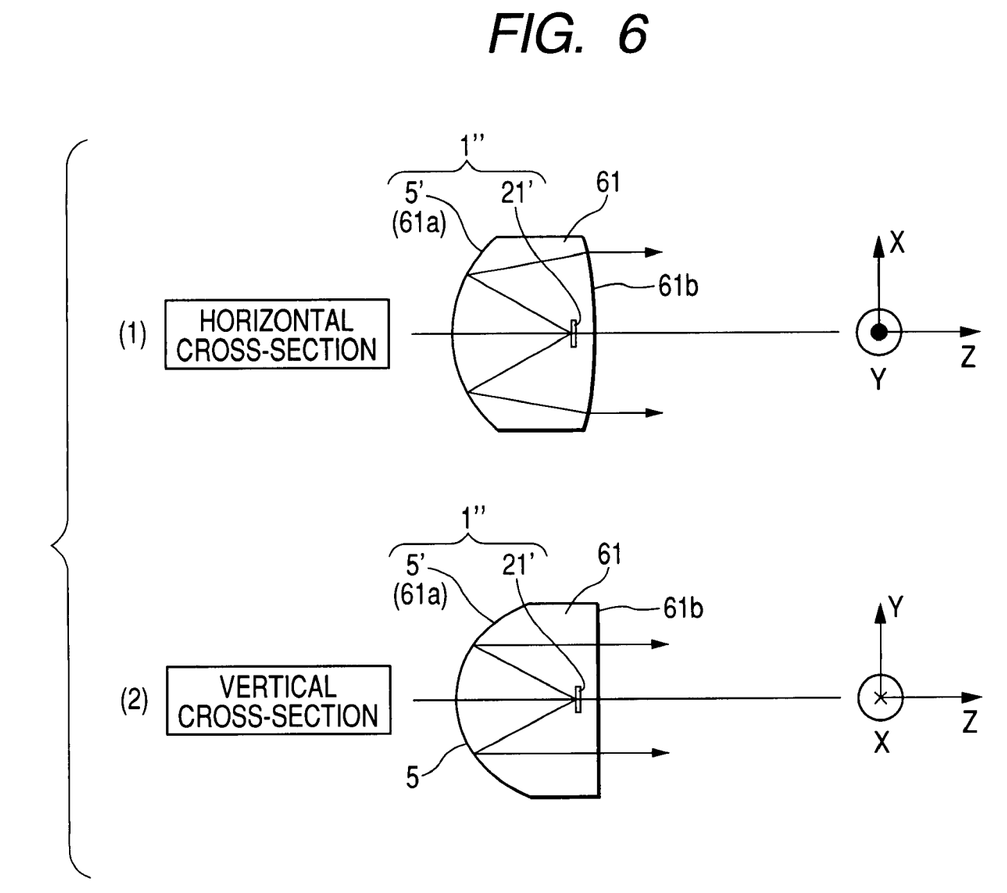
FIG. 6 is a diagram showing a third embodiment of the present invention.

FIG. 6 is a diagram showing the anamorphic optics used in the above third embodiment. A projection image display apparatus similar to that of the first embodiment is constructed using the above anamorphic optics in lieu of the anamorphic optics constituted by the collimator lens 50 in the first embodiment.

In FIG. 6, reflective LED element 1" has, as its LED chip, an LED portion 21' (having a light-emitting surface pointing in a negative direction of a Z-axis). Also, in the figure, the LED portion 21' is sealed with light-transmissive transparent resin 61. The transparent resin 61 also has a reflection surface shape 61a formed at the side facing a light-emitting surface of the LED portion 21', in the negative direction of the Z-axis. In addition, the transparent resin 61 has a spherical or non-spherical, convex surface shape 61b formed at a side opposite to the above-mentioned side in a positive direction of the Z-axis. Furthermore, the resin surface of the reflection surface shape 61a has a reflector 5' formed by deposition with a metal such as silver.

The reflector 5' (reflection surface shape 61a of the transparent resin 61) has such an elliptic surface that the LED portion 21' is located near a focal position of the reflector. However, as obvious from FIG. 6, although the surface shape of the reflector is symmetrical in vertical and horizontal directions, it is not rotationally symmetrical in an optical-axis direction and the reflector has a vertical (Y-axial) radius-of-curvature smaller than a horizontal (X-axial) radius-of-curvature. The convex surface shape 61b of the transparent resin 61 is also symmetrical in vertical and horizontal directions. This convex surface shape, however, is not rotationally symmetrical in an optical-axis direction, and the surface is formed with a vertical (Y-axial) radius-of-curvature greater than a horizontal (X-axial) radius-of-curvature (in FIG. 6, the convex surface is shown as a plane having an infinite radius of curvature in a vertical direction). The reflector 5' and a lens action of the transparent resin 61 having the convex surface shape 61b constitute the anamorphic optics whose vertical and horizontal enlarging ratios differ from each other. In the present embodiment, a vertical focal length is reduced below a horizontal one so that a light source image of the square LED portion 21' almost matches with the aperture 42 in terms of shape.

Operation of the reflective LED element 1" in the present embodiment is similar to that realized in the second embodiment, and description of the operation is therefore omitted. Since the LED element has the anamorphic optics, this structure simplifies an apparatus component configuration and is greatly effective for cost reduction.

Fourth Embodiment

Figure 7A:
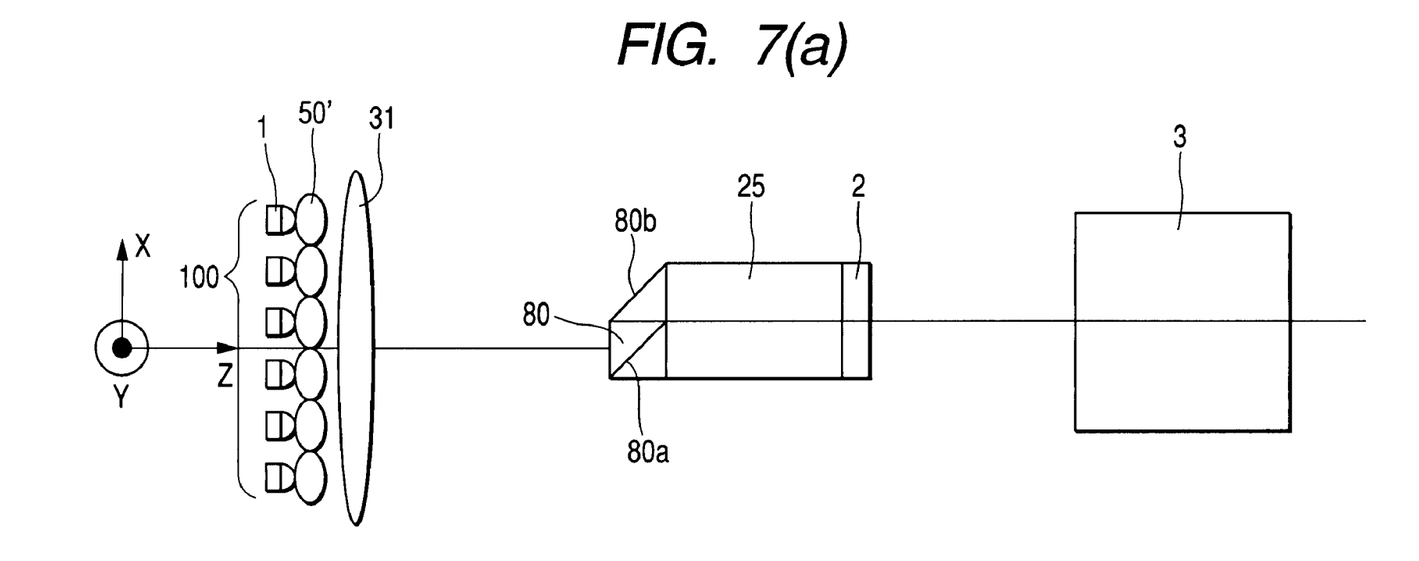
FIG. 7 is a diagram showing a fourth embodiment of the present invention.
Figure 7B:
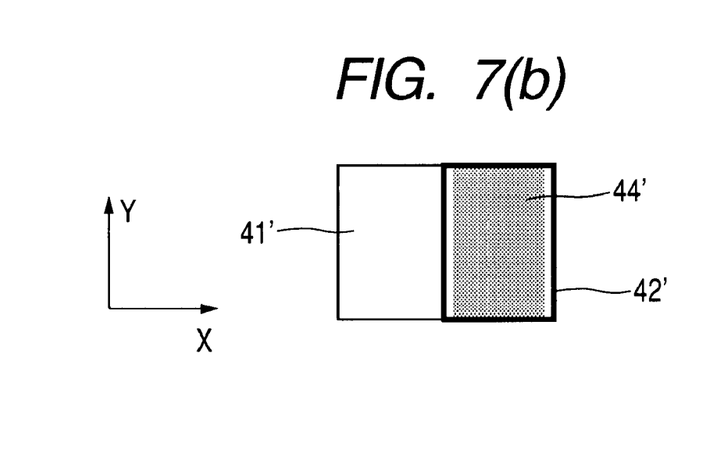

FIGS. 7A and 7B are diagrams explaining a fourth embodiment of the present invention and showing a configuration of a projection image display apparatus which uses a light pipe 25, not a lens array, as an integrator in an illumination optical system of the display apparatus.

FIG. 7A is a block diagram of the optical system, and FIG. 7B is a diagram showing the light source image formed on an incident aperture surface of a polarizing conversion element.

In FIG. 7A, similarly to the first embodiment, the fluxes of light that have been emitted from each LED portion 21 of LED elements 1 are first made parallel at the collimator lenses 50' that constitute anamorphic optics. Next, the light is introduced into an incident aperture of a polarizing conversion element 80 by a condensing lens 31, then aligned in a desired direction of polarization, by the polarizing conversion element 80, and enters the light pipe 25.

The polarizing conversion element 80 is constituted by, for example, a prism with opposed PBS faces 80a, 80b, and in the polarizing conversion element 80, of all the fluxes that have entered the PBS face 80a of the polarizing conversion element 80, only those polarized in the desired direction (hereinafter, these polarized fluxes are referred to collectively as the P-polarized wave) pass through and enter the light pipe 25. Also, the wave polarized in a direction orthogonal to that of the P-polarized wave (hereinafter, the former wave is referred to as the S-polarized wave) is reflected and further reflected by the opposed PBS face 80d. Next, the S-polarized wave is converted into a P-polarized wave by the ½-λ retardation plate (not shown) provided at the exit side, and then enters the light pipe 25. That is to say, the incident aperture in the polarizing conversion element 80 is of a size approximately half that of an exit aperture of the polarizing conversion element, namely, an incident aperture of the light pipe 25. The emitted flux from the LED portion 21 of the LED element 1, therefore, needs to be caused to enter the incident aperture of the polarizing conversion element 80 very efficiently As shown in FIG. 7B, incident aperture 41' in the light pipe 25 has a shape almost analogous to that of the horizontally long rectangular image display element having an aspect ratio of, for example, 4:3 or 16:9. Incident aperture 42' in the polarizing conversion element 80 has a shape half that of the incident aperture 41' in the light pipe 25 as if the aperture 41' were split into two sections horizontally. Consequently, similarly to the first embodiment, a cross section of the optical path limited by the shape of the polarizing conversion element 80 takes a vertically long rectangular shape equal to the shape of the incident aperture 42' of the polarizing conversion element 80. The collimator lens 50' must therefore be constituted using the anamorphic optics. This means that similarly to the first embodiment, two cylindrical surfaces having a lens action in directions orthogonal to each other need to be applied to the collimator lens 50'. In other words, there is a need to reduce a vertical focal length (increase a vertical enlarging ratio) and increase a horizontal focal length (reduce a horizontal enlarging ratio).

This configuration makes a light source image 44' of the LED portion 21 of the LED element 1 almost equal to the incident aperture 42' of the polarizing conversion element 80 in terms of size, as in FIG. 7B. Thus, the flux of light from the LED portion 21 of the LED element 1 can enter the incident aperture 42' of the polarizing conversion element 80 without an excess or a deficiency, with the consequence that high efficiency can be realized.

In the present embodiment, as in the first embodiment, when a focal length of the condensing lens 31 is taken as "fc1", a focal length of the collimator lens 50, as "fc", a length of one side (in a desired direction) of the aperture 42' of the polarizing conversion element 80, as "Sp", and a length of one side of the LED portion 21, as "St", enlarging ratios of the image formed on the incident aperture surface of the polarizing conversion element 80, with respect to the LED portion 21 of the LED element 1, are given by the following expression 5;

$$fc1i/fci = Spi/Sti \quad \text{(Expression 5)}$$

where "i" Is a suffix used, instead of "x" or "y" (in the first embodiment), to denote a horizontal (X-axial) or vertical (Y-axial) numeric value.

Use of reflective DMD, instead of the liquid-crystal panel 2, in the present embodiment, makes the polarizing conversion element unnecessary. This, in turn, makes the light source image of the LED portion 21 of the LED element 1 approximately agree with the incident aperture 41' of the light pipe 25 in terms of size. Therefore, there is a need, conversely to the above, to reduce the vertical enlarging ratio and increase the horizontal enlarging ratio. In short, the two cylindrical surfaces giving a lens action in directions orthogonal to each other need to be arranged in opposite order to that of the first embodiment.

Fifth Embodiment

FIG. 8, an explanatory diagram of a fifth embodiment of the present invention, shows a configurational example of a projection image display apparatus whose light source units use LED elements 1R, 1G, and 1R, for R-light, G-light, and B-light, respectively, and whose illumination optical system uses a light pipe 25.

In FIG. 8, symbol 1RU denotes an R-light source unit including a plurality of LED elements 1R for R-light, 1GU a G-light source unit including a plurality of LED elements 1G for G-light, and 1BU a B-light source unit including a plurality of LED elements 1B for B-light. Reference number 26 denotes a dichroic cross tube prism for synthesizing colors, 57 a first anamorphic lens, and 58 a second anamorphic lens. The first anamorphic lens 57 has an enlarging ratio that increases as light travels through the lens 57 in a direction perpendicular to its optical axis and in a direction extending from the reverse side of the paper, toward the surface thereof, and is equivalent to, for example, the first anamorphic lens 51 of FIG. 4A. The second anamorphic lens 58 has an enlarging ratio that decreases as light travels through the lens 58 in a direction perpendicular to its optical axis and parallel to the paper, and is equivalent to, for example, the second anamorphic lens 52 of FIG. 4A. When attention is focused on the light coming in from the G-light source unit 1GU, for the fluxes of G-light, the first anamorphic lenses 57 associated with the G-light LED elements 1G of the G-light source unit 1GU and the second anamorphic lenses 58 constitute the collimator lens 50' that forms the anamorphic optics of FIG. 7A. This relationship also applies to R-light and B-light. Other structural aspects are the same as for the construction of FIG. 6. The fluxes of light that have been emitted from the LED elements for each color of light are introduced toward the appropriate second anamorphic lenses 58 through the appropriate first anamorphic lenses 57 so as to be condensed onto second anamorphic lenses. During this process, the fluxes are color-synthesized by the dichroic cross tube prism 26.

When attention is focused on the light coming in from the G-light source unit 1GU, since, as mentioned above, the first anamorphic lenses 57 associated with the G-light LED elements 1G of the G-light source unit 1GU and the second anamorphic lenses 58 constitute the collimator lens 50' that forms the anamorphic optics of FIG. 7A, the fluxes of G-light emitted from the second anamorphic lenses 58 are made parallel to the optical axis. This relationship also applies to R-light and B-light. The second anamorphic lenses 58 are shared among the R-light, the G-light, and the B-light, and the respective fluxes are made almost parallel to one another. Thus, as shown in FIG. 9, a light source image 44' formed on an incident aperture surface of a polarizing conversion element 80 via the LED portions 21' of the R-light LED elements 1R, G-light LED elements 1G, and B-light LED elements 1B can be made into a size approximately equal to that of an incident aperture 42' of the polarizing conversion element 80 by actions of the first anamorphic lenses 57, second anamorphic lenses 58, and condensing lens 31. As a result, the emitted fluxes of light from the LED portions 21' of the R-light LED elements 1R, G-light LED elements 1G, and B-light LED elements 1B can be made to enter the incident aperture 42' of the polarizing conversion element 80 without an excess or a deficiency and high efficiency can thus be realized.

While each of the above embodiments uses a transmissive liquid-crystal panel(s) as an image display element(s), the present invention is not limited to these display elements and may use a reflective liquid-crystal panel(s), DMD, or the like, as an image display element(s). In addition, the image display apparatus itself is not limited to the projection type. Furthermore, while the above embodiments have been described assuming that the anamorphic optics has a structure in which lens actions occur in orthogonal directions, the present invention is not limited to such anamorphic optics and the anamorphic optics used may cause lens actions in directions other than orthogonal ones.

What is claimed is:

1. An image display apparatus that irradiates light from light sources onto an image display element and forms an optical image based on image signals, the image display apparatus comprising:

a light source unit with an LED-based light-emitting section;

anamorphic optics which converts a cross-sectional size or shape of the flux of light that formed a light source image of the LED-based light-emitting section, into a size or shape appropriate for an aperture of the portion that permits the flux of light of the light source image to pass through, in an optical system for irradiating light onto the image display element;

a first lens array which includes a plurality of lens cells and splits the incident light into a plurality of fluxes in which the incident light is sent from the anamorphic optics;

a second lens array which includes a plurality of lens cells and activates the lens cells to project shapes of the associated lens cells of the first lens array onto the image display element; and a polarizing conversion element which includes a plurality of unit prism units and causes the fluxes of light from the second lens array to align in a desired direction of polarization.

2. The image display apparatus according to claim 1, wherein:

said light source unit includes an LED-based light-emitting section and a reflector which reflects in a desired direction the light emitted from the LED-based light-emitting section.

3. The image display apparatus according to claim 1, wherein:

said anamorphic optics is constructed of a collimator lens.

4. The image display apparatus according to claim 1, wherein:

said anamorphic optics is constructed as a lens made of a resin used to seal said LED-based light-emitting section.

5. The image display apparatus according to claim 1, wherein:

said light source unit emits from said LED-based light-emitting section the flux of light that has an approximately rectangular cross section; and said anamorphic optics is adapted to change an aspect ratio of the flux of light.

6. The image display apparatus according to claim 1, wherein:

said LED-based light-emitting section includes a red LED-based light-emitting portion for generating red light, a green LED-based light-emitting portion for generating green light, and a blue LED-based light-emitting portion for generating blue light.

7. An image display apparatus that irradiates light from light sources onto an image display element and forms an optical image based on image signals, said apparatus comprising:

a light source unit with an LED-based light-emitting section;

a lens array including a plurality of small lens cells, said lens array forming a plurality of secondary light source images; and anamorphic optics which converts a cross-sectional size or shape of the flux of light that formed a light source image of said LED-based light-emitting section, into a size or shape appropriate for an aperture in the portion that permits the flux of light of the light source image to pass through, in an optical system present downstream with respect to said lens array;

wherein said display apparatus is adapted to satisfy fc=fm1·St/Sw, where fc is a focal length of the lens forming said anamorphic optics, fm1 is a focal length of said lens array, St is a cross-sectional size of the flux of light that formed the light source image of said LED-based light-emitting section, and Sw is a size of the aperture in the portion through which the flux of light of the light source image passes.

8. The image display apparatus according to claim 7, wherein:

said anamorphic optics is constructed of a collimator lens.

9. The image display apparatus according to claim 7, wherein:

said anamorphic optics is constructed as a lens made of a resin used to seal said LED-based light-emitting section.

10. The image display apparatus according to claim 7, wherein:

said light source unit emits from said LED-based light-emitting section the flux of light that has an approximately rectangular cross section; and said anamorphic optics is adapted to change an aspect ratio of the flux of light.

11. The image display apparatus according to claim 7, wherein:

said LED-based light-emitting section includes a red LED-based light-emitting portion for generating red light, a green LED-based light-emitting portion for generating green light, and a blue LED-based light-emitting portion for generating blue light.

12. An image display apparatus that irradiates light from light sources onto an image display element and forms an optical image based on image signals, said apparatus comprising:

a light source unit with an LED-based light-emitting section;

a condenser lens which condenses the light emitted from said LED-based light-emitting section;

a light pipe which integrates distribution of the light sent from said condenser lens; and anamorphic optics which converts a cross-sectional size or shape of the flux of light that formed a light source image of said LED-based light-emitting section, into a size or shape appropriate for an aperture of the portion that permits the flux of light of the light source image to pass through, in said light pipe;

wherein said display apparatus is adapted to satisfy fc=fc1·St/Sp, where fc is a focal length of the lens forming said anamorphic optics, fc1 is a focal length of said condensing lens, St is a cross-sectional size of the flux of light that formed the light source image of said LED-based light-emitting section, and Sp is an aperture size of the portion of said light pipe that permits the flux of light of the light source image to pass.

13. The image display apparatus according to claim 12, wherein:

said anamorphic optics is constructed of a collimator lens.

14. The image display apparatus according to claim 12, wherein:

said anamorphic optics is constructed as a lens made of a resin used to seal said LED-based light-emitting section.

15. The image display apparatus according to claim 12, wherein:

said light source unit emits from said LED-based light-emitting section the flux of light that has an approximately rectangular cross section; and said anamorphic optics is adapted to change an aspect ratio of the flux of light.

16. The image display apparatus according to claim 12, wherein:

said LED-based light-emitting section includes a red LED-based light-emitting portion for generating red light, a green LED-based light-emitting portion for generating green light, and a blue LED-based light-emitting portion for generating blue light.

* * * * *